(12) United States Patent
Nagayoshi et al.

(10) Patent No.: US 11,887,783 B2
(45) Date of Patent: Jan. 30, 2024

(54) CAPACITOR

(71) Applicant: KYOCERA Corporation, Kyoto (JP)

(72) Inventors: Maiko Nagayoshi, Kirishima (JP); Nobuyoshi Fujikawa, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 230 days.

(21) Appl. No.: 17/421,408

(22) PCT Filed: Jan. 17, 2020

(86) PCT No.: PCT/JP2020/001562
§ 371 (c)(1),
(2) Date: Jul. 8, 2021

(87) PCT Pub. No.: WO2020/153265
PCT Pub. Date: Jul. 30, 2020

(65) Prior Publication Data
US 2022/0084749 A1    Mar. 17, 2022

(30) Foreign Application Priority Data
Jan. 25, 2019    (JP) .................................. 2019-011361

(51) Int. Cl.
*H01G 2/08*        (2006.01)
*H01G 4/12*        (2006.01)
(Continued)

(52) U.S. Cl.
CPC ........... *H01G 2/08* (2013.01); *C04B 35/4682* (2013.01); *H01G 4/1227* (2013.01); *H01G 4/232* (2013.01);
(Continued)

(58) Field of Classification Search
CPC ........ H01G 2/08; H01G 4/1227; H01G 4/248; H01G 4/30; H01G 4/232; C04B 35/4682
(Continued)

(56) References Cited

U.S. PATENT DOCUMENTS

| 2012/0162858 A1* | 6/2012 | Tanaka | ..................... H01G 4/30 361/321.4 |
| 2013/0094121 A1* | 4/2013 | Endo | ..................... H01G 4/1209 361/305 |

(Continued)

FOREIGN PATENT DOCUMENTS

| JP | 2011-132056 A | 7/2011 |
| JP | 2015-162648 A | 9/2015 |

(Continued)

*Primary Examiner* — Arun Ramaswamy
(74) *Attorney, Agent, or Firm* — Volpe Koenig

(57) ABSTRACT

A capacitor according to an embodiment of the present disclosure is provided with a capacitor body in which a plurality of dielectric layers and a plurality of internal electrode layers are alternately laminated. The dielectric layers each includes crystal particles, grain boundaries and metal particles. An average particle size of the metal particles is smaller than an average particle size of the crystal particles and larger than an average width of interfacial grain boundaries among the grain boundaries. Observation of the longitudinal cross section of the dielectric layer shows that the metal particles are distributed along the width direction and the thickness direction of the dielectric layer.

4 Claims, 6 Drawing Sheets

(51) Int. Cl.
*H01G 4/248* (2006.01)
*H01G 4/232* (2006.01)
*H01G 4/30* (2006.01)
*C04B 35/46* (2006.01)
*C04B 35/468* (2006.01)
*H01G 4/08* (2006.01)

(52) U.S. Cl.
CPC ............... *H01G 4/248* (2013.01); *H01G 4/30* (2013.01); *C04B 2235/3206* (2013.01); *C04B 2235/3224* (2013.01); *C04B 2235/3236* (2013.01); *C04B 2235/3262* (2013.01); *C04B 2235/36* (2013.01); *C04B 2235/405* (2013.01); *C04B 2235/442* (2013.01); *H01G 4/08* (2013.01)

(58) Field of Classification Search
USPC ............ 361/301.4, 311, 321.1, 321.4, 321.5, 361/306.3, 312, 321.3
See application file for complete search history.

(56) References Cited

U.S. PATENT DOCUMENTS

| | | |
|---|---|---|
| 2018/0022655 A1 | 1/2018 | Majima et al. |
| 2018/0075971 A1* | 3/2018 | Lee .......................... H01G 2/22 |
| 2018/0174754 A1 | 6/2018 | Kitamura et al. |
| 2018/0182549 A1* | 6/2018 | Koide ................... C04B 35/638 |

FOREIGN PATENT DOCUMENTS

| | | |
|---|---|---|
| JP | 2016-160111 A | 9/2016 |
| JP | 2018-098433 A | 6/2018 |
| JP | 2018-107413 A | 7/2018 |
| KR | 10-2016-0007219 A | 1/2016 |

\* cited by examiner

CAPACITOR

TECHNICAL FIELD

The present disclosure relates to a laminated capacitor.

BACKGROUND ART

In recent years, there is progress in thickness reduction of dielectric layers and internal electrode layers of laminated capacitors (which may be referred to as capacitors hereinafter) in order to achieve smaller size and higher capacity (see, for example, Patent Document 1).

CITATION LIST

Patent Document

Patent Document 1: JP 2011-132056 A

SUMMARY

A capacitor according to an embodiment of the present disclosure is provided with a capacitor body in which a plurality of dielectric layers and a plurality of internal electrode layers are alternately laminated. The dielectric layers each includes crystal particles, grain boundaries and metal particles. An average particle size of the metal particles is smaller than an average particle size of the crystal particles and larger than an average width of interfacial grain boundaries among the grain boundaries. Observation of the longitudinal cross section of the dielectric layer shows that the metal particles are distributed along a width direction and a thickness direction of the dielectric layer.

DESCRIPTION OF EMBODIMENTS

Thickness reduction of a dielectric layer in a capacitor is one approach to increase the capacitance of the capacitor. However, when the dielectric layer is thin, it is difficult to ensure insulating property. That is, when a voltage is applied to the capacitor and is maintained for a long period of time, the capacitor generates heat, which raises the temperature, and as such, reliability of the capacitor tends to decline. That is, when an electronic equipment is driven, and a voltage is continuously applied to the capacitor, the temperature of the capacitor increases progressively because of the continuous application of voltage. The capacitor is under a condition of a high-temperature operating life testing, which is an example of a reliability test.

The present disclosure addresses such problem and has an object to provide a capacitor that easily radiates heat and whose reliability can be improved.

A capacitor according to an embodiment of the present disclosure will be described below with reference to FIGS. 1 to 4. The capacitor according to the present disclosure is not limited to the embodiments described below. The capacitor according to the present disclosure includes various aspects as long as it falls within the spirit or scope of the general inventive concepts as defined by the appended claims.

Figure 1:
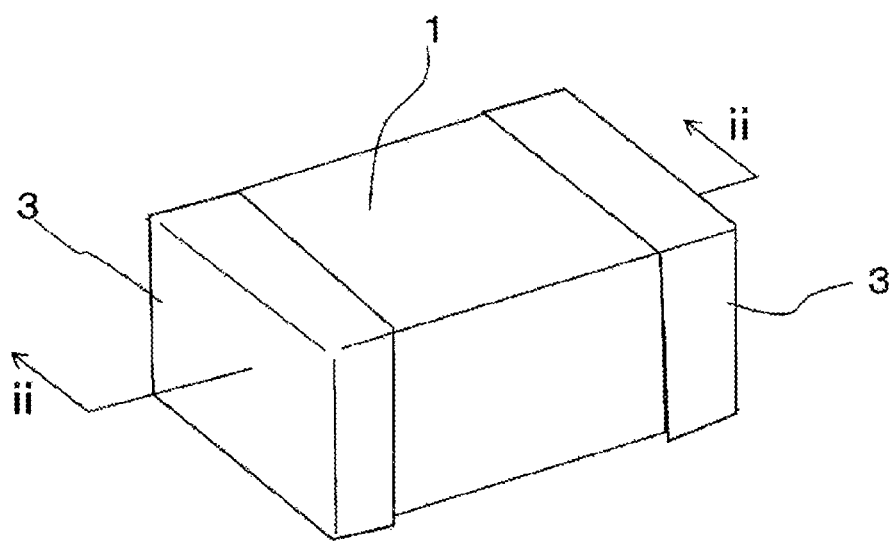
FIG. 1 is an exterior perspective view illustrating a capacitor according to an embodiment of the present disclosure.
Figure 2:
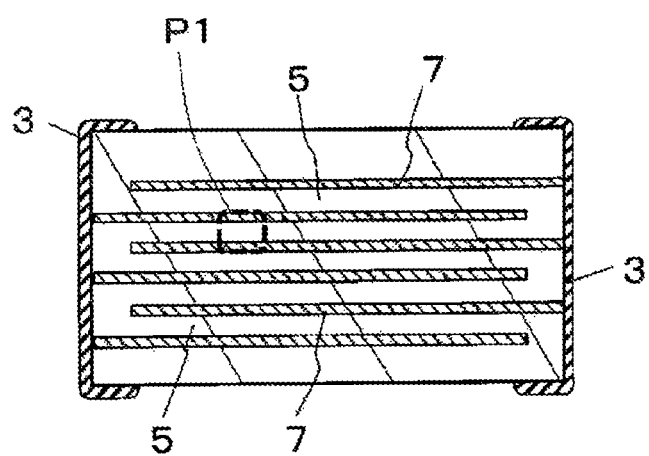
FIG. 2 is a cross-sectional view taken along a line ii-ii in FIG. 1.
Figure 3:
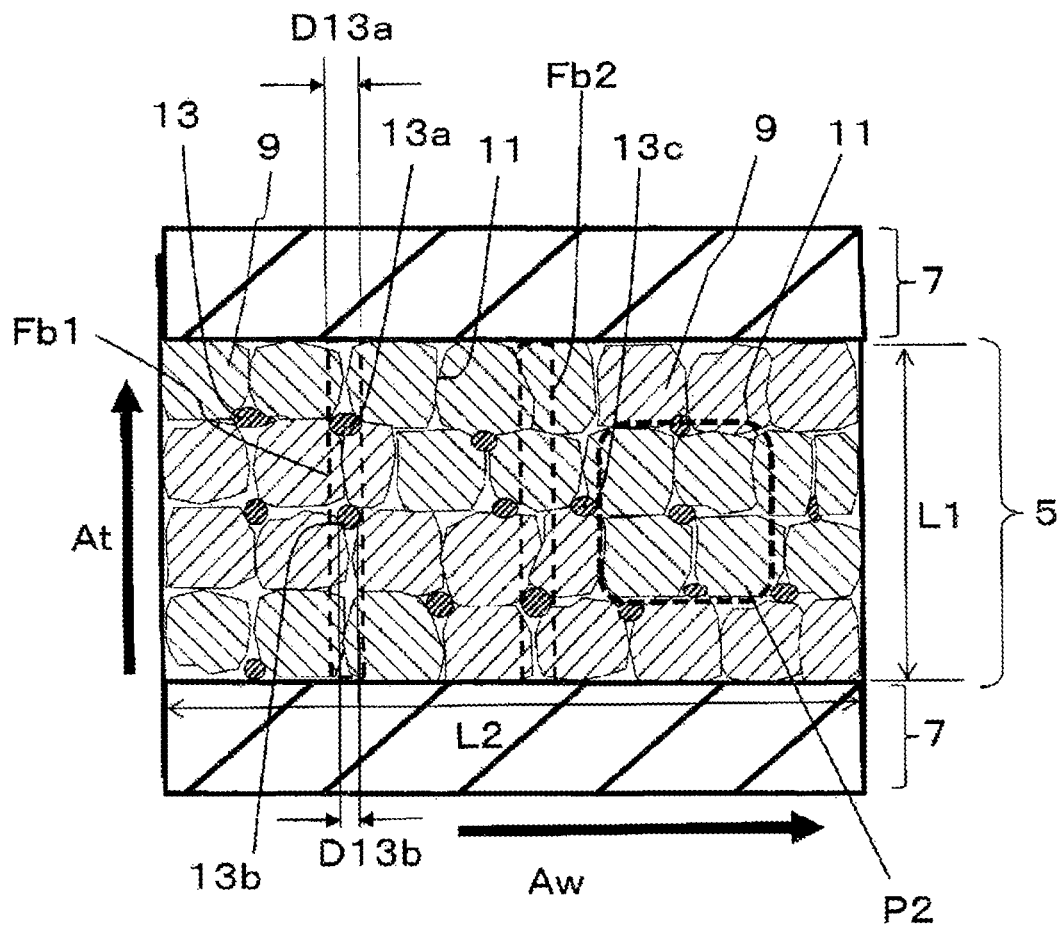
FIG. 3 is an enlarged view of an area P1 in FIG. 2.
Figure 4:
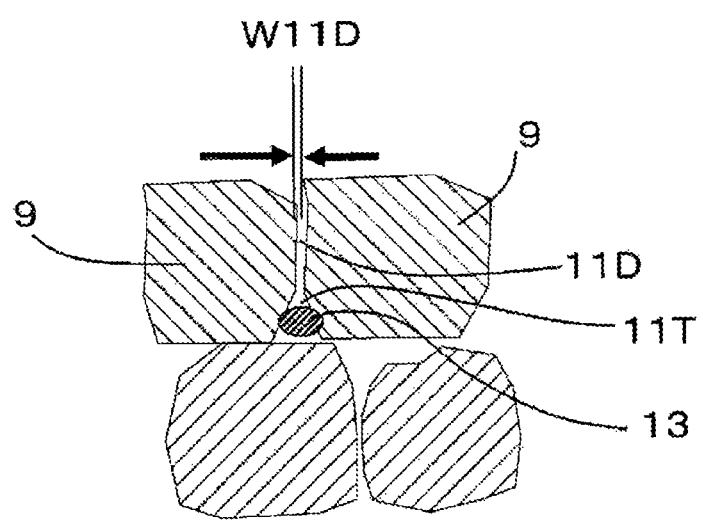
FIG. 4 is an enlarged view of an area P2 in FIG. 3.
Figure 5:
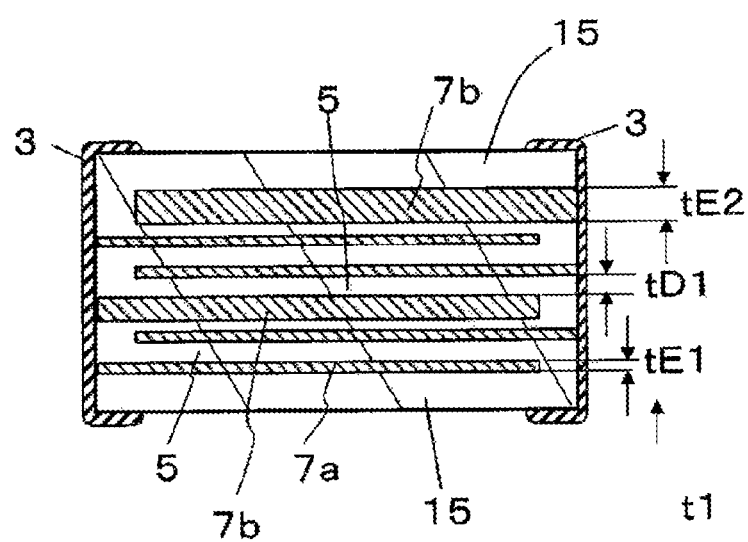
FIG. 5 is a cross-sectional view illustrating a capacitor according to another embodiment of the present disclosure.

FIG. 1 is an exterior perspective view of a capacitor according to an embodiment of the present disclosure. FIG. 2 is a cross-sectional view taken along a line ii-ii in FIG. 1. FIG. 3 is an enlarged view of an area P1 in FIG. 2. FIG. 4 is an enlarged view of an area P2 in FIG. 3. FIG. 5 is a cross-sectional view illustrating a capacitor according to another embodiment of the present disclosure.

As illustrated in FIG. 1, the capacitor according to an embodiment includes a capacitor body 1 and external electrodes 3 provided on end surfaces of the capacitor body 1. The capacitor body 1 includes dielectric layers 5 and internal electrode layers 7. A plurality of dielectric layers 5 and a plurality of internal electrode layers 7 are alternately laminated. The external electrodes 3 are electrically connected to the internal electrode layers 7. The dielectric layers 5 each include crystal particles 9, grain boundaries 11, and metal particles 13. The crystal particles 9 are surrounded by the grain boundaries 11. In other words, a plurality of crystal particles 9 are present with the grain boundaries 11 therebetween. Here, the crystal particles 9 are ceramic particles exhibiting dielectric property. The metal particles 13 are primarily present in the grain boundaries 11.

The crystal particles 9, the grain boundaries 11, and the metal particles 13 constituting the capacitor have the following relationships. An average particle size D13 of the metal particles 13 is smaller than an average particle size D9 of the crystal particles 9. The average particle size D13 of the metal particles 13 is larger than an average width W11 of the grain boundaries 11. A coefficient of thermal conductivity of the material of the metal particles 13 is larger than a coefficient of thermal conductivity of the material of the crystal particles 9. Observation of the longitudinal cross section of the dielectric layer 5 shows that the metal particles 13 are distributed along a width direction and a thickness direction of the dielectric layer 5. According to the capacitor according to an embodiment, the thermal conductivity of the dielectric layer 5 can be increased. This makes it possible to increase the heat radiating properties of the capacitor and improve reliability of the capacitor.

Here, the statement "observation of the longitudinal cross section of the dielectric layer 5 shows that the metal particles 13 are distributed along a width direction and a thickness direction of the dielectric layer 5" refers to a state in which the metal particles 13 are, while being separated from each other by the crystal particles 9, disposed along the thickness direction and the width direction of dielectric layer 5. The area in which the metal particles 13 disposed contains a plurality of the crystal particles 9. In other words, the metal particles 13 are present in the grain boundaries 11 surrounding the crystal particles 9. As illustrated in FIG. 3, the width direction of the dielectric layer 5 is the direction along a surface of the internal electrode layer 7 when a longitudinal cross section of the capacitor is viewed. In FIG. 3, the direction of the arrow denoted by the reference sign Aw is the width direction. Meanwhile, the thickness direction of the dielectric layer 5 is the direction of the arrow denoted by the reference sign At in FIG. 3, and is the direction along the thickness of the dielectric layer 5.

In the capacitor according to an embodiment, because of the relationship between the average particle size D13 of the metal particles 13 and an average width W11D of interfacial grain boundaries 11D among the grain boundaries 11, a large proportion of metal particles 13 is present in triple junction grain boundaries 11T among the grain boundaries 11. This is due to the size of the metal particles 13 as described below. That is, this is because the average particle size D13 of the metal particles 13 is smaller than the average particle size D9 of the crystal particles 9 and is larger than the average width W11D of the interfacial grain boundaries 11D among the grain boundaries 11. When the average particle size D13 of the metal particles 13 is smaller than the average width W11D of the interfacial grain boundaries 11D, the contribution to thermal conductivity by the metal particles 13 is decreased. The method for determining the average width W11D of the interfacial grain boundaries 11D will be described later.

The coefficient of thermal conductivity of the metal particles 13 is preferably higher than the coefficient of thermal conductivity of the crystal particles 9. For example, it is preferable that the coefficient of thermal conductivity of the metal particles 13 is ten times or greater the coefficient of thermal conductivity of the crystal particles 9, as in a case where barium titanate is used as the material of the dielectric layers 5 while nickel is used as the material of the internal electrode layers 7. In this case, the metal particles 13 and the internal electrode layers 7 may contain the same metal component as the main component.

When the main component of the material of the crystal particles 9 is, for example, barium titanate, various metal materials can be used as the metal particles 13 other than nickel. Examples include a precious metal material such as silver and palladium, as well as a base metal material such as copper. It is desirable to use the same metal material as described above for the internal electrode layers 7 and the external electrodes 3. The main components of the internal electrode layers 7 and the metal particles 13 may be the same. The coefficient of thermal conductivity of barium titanate is from 2.8 W/m·K to 3.1 W/m·K. The coefficient of thermal conductivity of nickel is from 90 W/m·K to 92 W/m·K. The coefficient of thermal conductivity of copper is from 400 W/m·K to 404 W/m·K.

In the capacitor according to an embodiment, a surface area occupied by the metal particles 13 in a cross-section of the dielectric layer 5 is preferably from 1.2% to 4%. In other words, the metal particles 13 in the dielectric layer 5 may account for from 1.2% to 4% of the surface area per unit area of the dielectric layer 5. When the proportion of the metal particles 13 in the dielectric layer 5 is within the range described above, the capacitor has insulating property, and can realize a capacitance that is close to the design value. "Design value of capacitance" refers to a capacitance that can be estimated from the thickness of the dielectric layer 5, the relative permittivity of the dielectric layer 5, and the effective area where the dielectric layer 5 and the internal electrode layer 7 overlap.

Analysis of the crystal structure or the like of the dielectric layer 5 is preferably performed using a scanning electron microscope equipped with an analysis device. The proportion of metal particles 13 present in the dielectric layer 5 can be determined, for example, by the following procedure.

First, a sample having a cross-section as illustrated in FIG. 2 exposed is produced by cutting or polishing the capacitor. An etching treatment of the cross-section of the sample is performed as necessary so that the contour of each of the crystal particles 9, the grain boundaries 11, and the metal particles 13 is made clear. The resulting sample is then observed using a scanning electron microscope; a cross-section as illustrated in FIG. 3 is selected, and an image of the crystal structure is taken. Next, in the selected cross-section of the sample, a range of an area where about one of the dielectric layers 5 can be seen is defined as a unit area, and the surface area of the unit area is determined. Then, the surface areas of the individual metal particles 13 present within the range of the unit area are determined. The total surface area of the metal particles 13 is then determined. The total surface area of the metal particles 13 is represented by Am, and the unit area of the dielectric layer 5 is represented by Ad. The surface area ratio of the metal particles 13 per unit area of the dielectric layer 5 is determined from the ratio of Am/Ad. The surface area of the metal particles 13 is determined from the image obtained using a scanning electron microscope. Specifically, first, the contours of the individual metal particles 13 appearing in the image are mapped. The contours are then subjected to image analysis to calculate the surface areas. The particle sizes of the metal particles 13 are determined by converting the surface areas determined by image analysis of the contours of the metal particles 13 into the surface areas of a circle.

The average particle size of the metal particles 13 is the average value of the individually-calculated particle sizes of the metal particles 13. The number (n) of the metal particles 13 for particle size determination may be, for example, from 10 to 30. The range defined as a unit area is a range that is the product of L1 and L2, L1 being the length of one dielectric layer 5 in the thickness direction, while L2 being the length of the dielectric layer 5 in the width direction. L1 may be the thickness of one dielectric layer 5. L2 may be the total width of one dielectric layer 5 in the capacitor body 1, or may be in a range of from two times to ten times the length of L1. The measurement of the average particle size of the crystal particles 9 may employ the same method as for the metal particles 13.

The width of the interfacial grain boundaries 11D is determined by, for example, the following method. FIG. 4 illustrates the width W11D of the interfacial grain boundaries 11. First, a plurality of the crystal particles 9 present within the range of the unit area described above are randomly chosen. For example, the number of crystal particles 9 chosen may be from 3 to 5. Next, from 5 to 10 spots of the interfacial grain boundaries outlined by the contours of the chosen crystal particles 9 are measured, and the average value of the results is calculated.

In this capacitor, the dielectric layer 5 may have a configuration in which a plurality of the metal particles 13 is aligned in an overlapping manner, when viewed in the thickness direction of the dielectric layer 5. An explanation will be made as follows while comparing two spots marked by dashed line frame Fb1 and dashed line frame Fb2 in FIG. 3. In the dashed line frame Fb1, a metal particle 13a and a metal particle 13b are present along the thickness direction of the dielectric layer 5. Meanwhile, there is one metal particle 13c in the dashed line frame Fb2. When the dielectric layer 5 and the internal electrode layers 7 are viewed from the lamination direction, the metal particle 13a and the metal particle 13b present in the dashed line frame Fb1 are at least partially overlapped. In FIG. 3, as illustrated in the dashed line frame Fb1, the metal particle 13a and the metal particle 13b are viewed from the thickness direction of the dielectric layer 5. When the metal particle 13a and the metal particle 13b overlap, the distance between the metal particle 13a and the metal particle 13b is shorter than the distance, along the thickness direction of the dielectric layer 5, between two internal electrode layers 7 sandwiching the dielectric layer 5 vertically. As a result, the thermal conductivity in the thickness direction of the dielectric layer 5 can be further increased. In FIG. 3, the diameter D13a of the metal particle 13a is larger than the diameter D13b of the metal particle 13b. When the dielectric layer 5 and the internal electrode layers 7 are viewed from the lamination direction, the metal particle 13b is hidden behind the metal particle 13a. In addition, when two or more metal particles 13 are aligned in the thickness direction of the dielectric layer 5, a portion of the metal particles 13 may overlap.

FIG. 5 is a cross-sectional view illustrating a capacitor according to another embodiment of the present disclosure. In the capacitor according to another embodiment, an internal electrode layer 7 having a thickness larger than the thickness of the dielectric layer 5 may be included in the capacitor body 1. A plurality of the internal electrode layers 7 may include internal electrode layers 7a and 7b having different thicknesses. In FIG. 5, an internal electrode layer having a small thickness is represented by the reference sign 7a. Meanwhile, an internal electrode layer having a large thickness is represented by the reference sign 7b. In FIG. 5, the reference sign of the thickness of the dielectric layer 5 is tD1. The reference sign of the thickness of the internal electrode layer 7a is tE1. The reference sign of the thickness of the internal electrode layer 7b is tE2.

The thickness tE2 of the internal electrode layer 7b is larger than the thickness tD1 of the dielectric layer 5. The thickness tE1 of the internal electrode layer 7a is smaller than the thickness tD1 of the dielectric layer 5. When the internal electrode layer 7b having a thickness larger than that of the dielectric layer 5 is included in the capacitor body 1, the volume ratio of the internal electrode layers 7 to the overall volume of the capacitor body 1 increases. As a result, heat radiating properties of the internal electrode layers 7 can be further increased. In this case, it is preferable that, of a dielectric layer 5 and an internal electrode layer 7 that are adjacent to each other, the thickness of the internal electrode layer 7 is larger than the thickness of the dielectric layer 5 throughout the entire layer of the internal electrode layer 7 extending in the planar direction. In this case, the capacitor body 1 preferably contains the internal electrode layers 7b having a large thickness as many as possible as long as the specified size and capacitance are satisfied. A proportion of the number of the internal electrode layers 7b having a large thickness is preferably 50% or greater.

Figure 6:
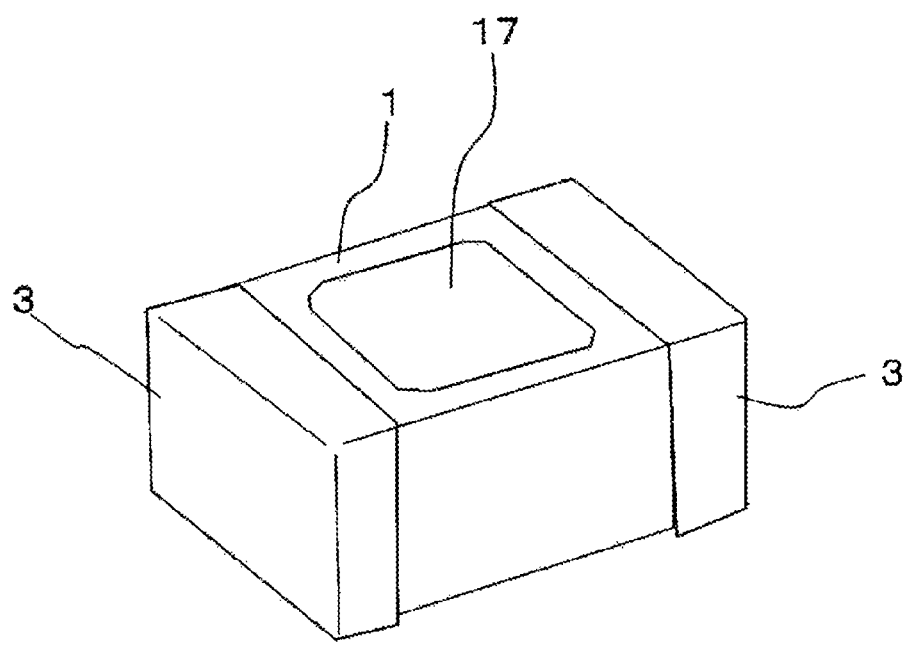
FIG. 6 is an exterior perspective view illustrating a capacitor according to yet another embodiment of the present disclosure.

FIG. 6 is an exterior perspective view illustrating a capacitor according to yet another embodiment of the present disclosure. In the capacitor according to yet another embodiment, the capacitor may include a metal film 17, the metal film 17 being provided on a surface of the capacitor body 1 excluding a region in which the external electrode 3 is provided while being in a position spaced apart from the external electrodes 3. When the metal film 17 is disposed at a position on a surface of the capacitor body 1, the amount of heat radiation of the capacitor in a region without the external electrode 3 can be increased.

In this case, the metal films 17 may be provided on at least two side surfaces out of the four side surfaces of the capacitor body. When the metal films 17 are provided on two side surfaces, the metal films 17 may be disposed so as to face each other. When the metal films 17 are disposed on the surfaces of the capacitor body 1 while facing each other, it is possible to suppress expansion of the capacitor in the lamination direction when the capacitor realizes a capacitance. As a result, the generation of cracks is suppressed, and a higher reliability can be obtained.

In addition, the capacitor according to yet another embodiment is suitable for a multi-layer laminated capacitor having 100 or more laminated layers. Furthermore, the material for forming the dielectric layers 5 may be a dielectric material that exhibits paraelectricity, such as titanium oxide, strontium titanate, and calcium titanate, in addition to barium titanate described above.

Next, an embodiment of a method for producing a capacitor of the present disclosure will be described. The capacitor of the present disclosure can be produced by a commonly used manufacturing method for a capacitor, except that a conductive paste as described below is used as the conductive paste for forming an internal electrode pattern. The capacitor of the present disclosure can be obtained by using a conductive paste containing an additive containing a chlorine component. When an additive containing a chlorine component is used in the conductive paste, metal powder in the conductive paste readily diffuses in a ceramic green sheet. The reason that the metal powder readily diffuses in the ceramic green sheet by the use of the additive containing a chlorine component is because a certain solvent used in the conductive paste moderately dissolves the additive containing a chlorine component and an organic vehicle used in the ceramic green sheet. In this case, the surface area ratio of metal particles present in the dielectric layer is adjusted by the addition amount of the additive. Hereinafter, a detailed description will be given with reference to Examples.

EXAMPLES

A capacitor was produced, and its characteristics were evaluated as described below. First, barium titanate powder ($BaTiO_3$), magnesium oxide powder (MgO), dysprosium oxide powder ($Dy_2O_3$), manganese carbonate powder ($MnCO_3$), and glass powder [$SiO_2$=55, BaO=20, CaO=15, $Li_2O_3$=10 (mol %)] were prepared as the raw material powder for preparing a dielectric powder. The dielectric powder has the following composition: 0.8 mol of magnesium oxide powder (MgO) in terms of MgO, 0.8 mol of dysprosium oxide powder ($Dy_2O_3$), 0.3 mol of $MnCO_3$ powder in terms of MnO were added per 100 mol of barium titanate powder; and 1 part by mass of a glass component ($SiO_2$—BaO—CaO-based glass powder) was further added per 100 parts by mass of barium titanate powder.

A ceramic green sheet having an average thickness of 1.3 μm was produced by a doctor blade method using a slurry prepared by mixing an organic vehicle with the dielectric powder described above. A butyral resin was used as the resin contained in the organic vehicle when preparing the ceramic green sheet. The addition amount of the butyral resin was 10 parts by mass per 100 parts by mass of the dielectric powder. A solvent in which ethyl alcohol and toluene were mixed at a mass ratio of 1:1 was used as the solvent. Nickel powder was used as the metal in the conductive paste to form an internal electrode pattern. Ethyl cellulose was used as the resin for preparing the conductive paste. The addition amount of ethyl cellulose was 5 parts by mass per 100 parts by mass of nickel powder. A mixture of dihydroterpineol solvent and butyl cellosolve was used as the solvent. A polyethylene glycol dispersing agent containing a chlorine component was added to the conductive paste as an additive. The addition amounts of the additives are shown in Table 1. The addition amounts of the additives shown in Table 1 are the proportions per 100 parts by mass of nickel powder.

Next, the conductive paste was printed on the ceramic green sheet produced to produce a pattern sheet. A pattern sheet, in which the thickness of the internal electrode pattern was larger than the thickness of the ceramic green sheet, was also produced.

Next, 200 layers of the pattern sheet produced were laminated to produce a core laminate. The pattern sheets, in which the thickness of the internal electrode pattern was larger than the thickness of the ceramic green sheet, and regular pattern sheets were alternately laminated in the lamination direction. Next, to produce a base laminate, the upper surface and the lower surface of the core laminate were each overlaid by the ceramic green sheet. After this, the base laminate was cut to produce a compact of a capacitor body.

Next, to produce a capacitor body, the compact of a capacitor body produced was subjected to firing. The conditions for the firing were set to a temperature elevation rate of 900° C./h with a maximum temperature of 1080° C. in hydrogen-nitrogen. A roller hearth kiln was used in this firing. Next, a reoxidation treatment was performed on the capacitor body produced. The conditions for the reoxidation treatment were set to a maximum temperature of 1000° C. and a holding time of 5 hours in a nitrogen atmosphere.

The size of the capacitor body obtained was 2 mm×1.25 mm×1.25 mm, and the average thickness of the dielectric layers was 1 μm. The average thickness of the internal electrode layers was from 0.8 μm to 1.2 μm. The design value of capacitance of the capacitor produced was set to 10 μF.

Next, after the capacitor body was barrel polished, an external electrode paste was applied to both end portions of the capacitor body, and external electrodes were formed by baking at a temperature of 800° C.

Furthermore, a sample having a flat surface pattern that forms a metal film was produced using the external electrode paste, the flat surface pattern being at a position spaced apart from the external electrodes. The sample has a flat surface pattern formed on each of two surfaces that face each other in the lamination direction of the capacitor body. A sample having a flat surface pattern formed also on each of the remaining two surfaces, namely, having a total of four flat surface patterns formed, was also prepared. As such, two types of samples having flat surface patterns formed were prepared. The external electrode paste used contains Cu powder and glass. Thereafter, Ni plating and Sn plating were sequentially formed on the surface of the external electrodes using an electrolysis barrel device, and a capacitor was obtained.

The capacitor produced was evaluated as follows. First, the capacitor was mirror-polished to expose a cross-section as illustrated in FIG. 2, and the state of the metal particles present in the dielectric layers was observed. For a sample having an addition amount of additive of 0.05 parts by mass or greater, the presence of metal particles was able to be confirmed. The proportion of metal particles present in the dielectric layers was determined as follows.

First, a sample was prepared by polishing the capacitor to expose a cross-section as illustrated in FIG. 2. Next, a thermal etching process was performed so that the contour of each of the crystal particles, grain boundaries, and metal particles in the cross-section of the dielectric layers was clearly visible. The resulting sample was then observed using a scanning electron microscope. Next, a cross-section as illustrated in FIG. 3 was selected. The selected region is both a central portion of the cross-section of the capacitor body in the lamination direction and a central portion of the capacitor in the longitudinal direction (cross-section along the length of the capacitor). The number of selected region is one. The range defined as a unit area is a range that is the product of L1 and L2, L1 being the length of one layer of the dielectric layer in the thickness direction, while L2 being the length of the dielectric layer in the width direction. L2 was set to a range of 5 times the length of L1.

Then, the surface area of each of the metal particles and the total surface area of the metal particles present within the range of the unit area were determined. The surface area of a metal particle was determined using an image obtained by a scanning electron microscope. The surface area of a metal particle was determined by image analysis of the contour of the metal particle. The particle size of a metal particle was determined by converting the surface area determined by image analysis of the contour of the metal particle into the surface area of a circle. The average particle size of the metal particles was the average value of the individually-calculated particle sizes of the metal particles. The number (n number) of metal particles measured was from 20 to 25. The total surface area of the metal particles was represented by Am, and the unit area of the dielectric layer was represented by Ad. The surface area ratio of the metal particles per unit area of the dielectric layer was determined from the ratio of Am/Ad. The same method as for the metal particles was used to determine the average particle size of the crystal particles.

The width of the interfacial grain boundaries was determined by the following method. First, from 3 to 5 crystal particles present within the range of the unit area described above were randomly selected. Next, 10 spots of the interfacial grain boundaries outlined by the contours of the crystal particles selected were chosen and measured. For each of the 10 spots, the largest width was selected as the width of the interfacial grain boundary. Finally, the average value of the widths (W11D) of the 10 spots of the interfacial grain boundaries was calculated.

From the image, the presence or absence of a plurality of metal particles aligned in the dielectric layer in an overlapping manner when viewed in the thickness direction of the dielectric layer was evaluated. The samples produced all have an average particle size of the crystal particles of 0.26 μm. Meanwhile, the width of the interfacial grain boundaries was 0.06 μm in all the samples produced. Metal particles were present in the grain boundaries. The proportion of the metal particles present in triple junction grain boundaries was not less than 90%.

Next, for dielectric characteristics, the capacitance was measured under conditions in which no direct current voltage was applied (alternating current voltage 0.5 V, frequency 1 kHz). An average value of the capacitance was calculated using 30 samples. All of the samples whose capacitance could be measured had a capacitance of 9.7 μF or greater.

A high-temperature operating test evaluated the time at which the first occurrence of failure was observed under conditions of a temperature of 170° C. and a direct current voltage of 30 V. When the capacitor was in a short-circuited state, the capacitor was considered defective.

The number of samples was 20.

TABLE 1

| Sample No. | Addition amount of additive Parts by mass | Metal particles Present: Yes Absent: No | Metal particles Average particle size μm | Metal particles Surface area ratio (Am/Ad) % | Number of internal electrode layer thicker than dielectric layer Number of layers/ 200 layers | Presence/absence of a plurality of metal particles aligned in an overlapping manner when viewed in the thickness direction of dielectric layer Present: Yes; Absent: No |
|---|---|---|---|---|---|---|
| 1 | 0 | No | — | 0 | 0 | No |
| 2 | 0.01 | No | — | 0 | 0 | No |
| 3 | 0.05 | Yes | 0.08 | 1 | 0 | Yes |
| 4 | 0.1 | Yes | 0.13 | 1.2 | 0 | Yes |
| 5 | 0.5 | Yes | 0.16 | 1.7 | 0 | Yes |
| 6 | 1 | Yes | 0.18 | 2.4 | 0 | Yes |
| 7 | 1.5 | Yes | 0.24 | 4 | 0 | Yes |
| 8 | 2 | Yes | 0.3 | 6 | 0 | Yes |
| 9 | 0.05 | Yes | 0.08 | 1 | 100 | Yes |
| 10 | 0.1 | Yes | 0.13 | 1.2 | 100 | Yes |
| 11 | 0.5 | Yes | 0.16 | 1.7 | 100 | Yes |
| 12 | 1 | Yes | 0.18 | 2.4 | 100 | Yes |
| 13 | 1.5 | Yes | 0.24 | 4 | 100 | Yes |
| 14 | 0.5 | Yes | 0.16 | 1.7 | 0 | Yes |
| 15 | 1 | Yes | 0.18 | 2.4 | 0 | Yes |
| 16 | 0.5 | Yes | 0.16 | 1.7 | 0 | Yes |
| 17 | 1 | Yes | 0.18 | 2.4 | 0 | Yes |

| Sample No. | Metal film Present: Yes Absent: No | Metal film Number of spots | Expression of capacitance Present: Yes Absent: No | High-temperature operating life Time |
|---|---|---|---|---|
| 1 | No | 0 | Yes | 12 |
| 2 | No | 0 | Yes | 12 |
| 3 | No | 0 | Yes | 16 |
| 4 | No | 0 | Yes | 18 |
| 5 | No | 0 | Yes | 20 |
| 6 | No | 0 | Yes | 22 |
| 7 | No | 0 | Yes | 24 |
| 8 | No | 0 | No | — |
| 9 | No | 0 | Yes | 17 |
| 10 | No | 0 | Yes | 19 |
| 11 | No | 0 | Yes | 22 |
| 12 | No | 0 | Yes | 23 |
| 13 | No | 0 | Yes | 26 |
| 14 | Yes | 2 | Yes | 24 |
| 15 | Yes | 2 | Yes | 25 |
| 16 | Yes | 4 | Yes | 26 |
| 17 | Yes | 4 | Yes | 27 |

As seen from Table 1, except for the samples in which metal particles were not present in the dielectric layer (Sample No. 1, Sample No. 2), Samples No. 3 to 17 all had a high-temperature operating life of 16 hours or longer. The capacitors of Samples No. 3 to 17 were found to have high heat radiating properties.

Samples No. 4 to 7 and Samples No. 10 to 17, in which the surface area ratio of the metal particles per unit area of the dielectric layer was from 1.2% to 4%, had a high-temperature operating life of from 18 hours to 27 hours. Among these samples, the samples having an internal electrode layer thicker than a dielectric layer (Samples No. 10 to 13) had a longer high-temperature operating life than those of the samples without an internal electrode layer thicker than a dielectric layer (Samples No. 4 to 7).

Furthermore, the samples provided with a metal film that was on a surface of the capacitor body excluding a region in which the external electrode had been provided and was in a position spaced apart from the external electrodes (Samples No. 14 to 17), also had a longer high-temperature operating life than those of the capacitors of Samples No. 4 to 7. Sample No. 8 had a large proportion of metal particles, which resulted in reduction in insulating property, and therefore did not yield capacitance equivalent to those of other samples.

REFERENCE SIGNS LIST

1 Capacitor body
3 External electrode
5 Dielectric layer
7 Internal electrode layer
9 Crystal particle
11 Grain boundary
13 Metal particle
17 Metal film

The invention claimed is:
1. A capacitor comprising:
a capacitor body;
a plurality of dielectric layers; and a plurality of internal electrode layers that are alternately laminated with the plurality of dielectric layers within the capacitor body, wherein:

the dielectric layers each comprises crystal particles, grain boundaries, and metal particles, the metal particles have an average particle size that is smaller than an average particle size of the crystal particles and larger than an average width of interfacial grain boundaries among the grain boundaries, the metal particles are distributed along a width direction and a thickness direction of the dielectric layer in a longitudinal cross-section of the dielectric layer, and at least one of the dielectric layers comprises a portion in which a plurality of the metal particles are aligned in an overlapping manner in the thickness direction of the dielectric layer.

2. The capacitor according to claim 1, wherein a surface area occupied by the metal particles in the longitudinal cross-section of the dielectric layer is from 1.2% to 4%.

3. The capacitor according to claim 1, wherein at least one of the plurality of the internal electrode layers has an average thickness greater than an average thickness of the dielectric layers.

4. The capacitor according to claim 1, wherein the capacitor body comprises external electrodes, each of the external electrodes being comprised on each of two end surfaces facing each other and being electrically connected to the internal electrode layers; and the capacitor comprises a metal film on a surface of the capacitor body, at a position spaced apart from the external electrodes.

* * * * *